United States Patent [19]

Wehmeyer

[11] Patent Number: 4,595,242
[45] Date of Patent: Jun. 17, 1986

[54] REAR HUB SHELL FOR BICYCLES AND METHOD OF MANUFACTURING SAME

[75] Inventor: Gerhard Wehmeyer, Werther, Fed. Rep. of Germany

[73] Assignee: Weco Wehmeyer & Co. Fahrzeug-Fahrzeugteile-Werke GmbH & Co., Werther, Fed. Rep. of Germany

[21] Appl. No.: 643,917

[22] Filed: Aug. 23, 1984

[30] Foreign Application Priority Data

Aug. 30, 1983 [DE] Fed. Rep. of Germany ....... 3331142

[51] Int. Cl.$^4$ ................................................. B60B 5/02
[52] U.S. Cl. ............................... 301/6 V; 301/63 PW; 301/105 B
[58] Field of Search ............... 301/55, 58, 59, 63 PW, 301/105 R, 105 B, 106, 109, 112, 114, 122, 6 D, 6 V, 6 R

[56] References Cited

U.S. PATENT DOCUMENTS 622,635  4/1899  Reed ................................... 301/6 D

FOREIGN PATENT DOCUMENTS

| 1226929 | 4/1960 | France | 301/105 B |
| 1267226 | 6/1961 | France | 301/105 B |
| 2482526 | 11/1980 | France . | |
| 313301 | 6/1929 | United Kingdom | 301/105 B |
| 573423 | 11/1943 | United Kingdom | 301/105 B |
| 693286 | 6/1953 | United Kingdom | 301/6 D |

Primary Examiner—David A. Scherbel
Assistant Examiner—Russell D. Stormer
Attorney, Agent, or Firm—Sprung Horn Kramer & Woods

[57] ABSTRACT

A hub shell is made in one piece out of plastic and a metal ring is positively connected externally to at least one of its hub heads in such a way that it can neither rotate nor be displaced axially. The metal ring has longitudinal grooves and a continuous annular groove and can easily be provided with fine threading on the outside for attaching a chain wheel. The ring is heated to plasticize the material of the hub head inserted in it until the material can be forced and vibrated into the grooves.

9 Claims, 2 Drawing Figures

REAR HUB SHELL FOR BICYCLES AND METHOD OF MANUFACTURING SAME

BACKGROUND OF THE INVENTION

The present invention relates to a one-piece rear hub shell for bicycle wheels that consists of a tube with heads on it at the sides and that have perforations to accommodate wheel spokes.

Hub shells of this type now consist in general of metal. Some in particular are made in several parts out of steel and some in one piece out of aluminum. Both types are expensive to manufacture partly because of complicated assembly operations and partly because of the high cost of aluminum.

A multipart hub shell in which the tube and adjacent areas are made in one piece out of plastic and function as an external accommodation for the bearing while the flanged heads are again made out of metal is also known, with the extensive involvement of metal parts and the requisite assembly operations again accounting for high manufacturing costs.

None of the known hub shells involve any problems in attaching the drive mechanism, specifically the wheels for the chain drive, each on at least one side of the shell and on its own hub head, because a metal component is available there in all known designs that provides sufficient strength for the fine threading that chain wheels are conventionally supplied with to transmit the drive forces.

SUMMARY OF THE INVENTION

The object of the present invention is to provide both a hub shell of the aforesaid type and a method of manufacturing it that will make it conceptually simple and very inexpensive to manufacture while fully preserving the requisite strength of the threaded area of the drive mechanism.

This object is attained in relation to the hub shell in accordance with the invention in that it is made in one piece out of plastic and a metal ring is positively connected externally to at least one of the hub heads in such a way that it can neither rotate nor be displaced axially.

A rear hub shell of this type is a plastic component that is inexpensive because it is essentially in one piece but that will still be stable if the appropriate plastic is selected. The shell, however, does have a metal ring, which is in itself simple to manufacture, only where it is necessary to strengthen the fine threading. A reliable joint between the hub head and the metal ring can be rapidly and simply established in one automatic manufacturing step because the head and ring are smoothly and rapidly forced together while the appropriate areas of the plastic in the head are plasticized and the operation is promoted both with respect to time and to reliable filling of the positive seating for the material in the metal ring by the simultaneous vibration.

The metal ring preferably has grooves in its inner surface that are parallel to one another and to its longitudinal axis and that are full of the hub-head material. The ring can also preferably have a continuous annular groove full of the hub-head material around it.

The ring is preferably shaped by upsetting and can have a continuous upset fold full of the hub-head material around it.

The ring further preferably has a limiting shoulder and fine threading on the outside.

The ring is preferably made of aluminum and the hub shell can be thermoplastic, preferably fiberglass-reinforced polyamide.

In another embodiment, a bushing can be force-fit into the inside surface of the hub head that accommodates the metal ring. Moreoever, the hub head can taper conically outward where it accommodates the metal ring and the inside surface of the the metal ring can have a matching taper.

The object is attained in relation to the method of manufacturing the hub shell in that the material in the area of the hub head that accommodates the metal ring is hot-plasticized and forced, while being simultaneously vibrated, into a positive seating in the metal ring.

The metal ring with its conical inside surface can be forced as far as possible onto the conical hub head and the metal ring then heated to plasticize the hub-head material.

The pressure needed to completely force the metal ring onto the hub head can be generated by applying a weight with the hub shell and metal ring positioned vertically.

A core can be inserted into the interior seat of the hub shell in the appropriate area of the hub head while the hub-head material is being plasticized and the metal ring forced on.

A preferred embodiment of the invention and of the method of manufacturing it will now be described with reference to the attached drawing, wherein:

DETAILED DESCRIPTION OF THE PREFERRED EMBODIMENT

Figure 1:
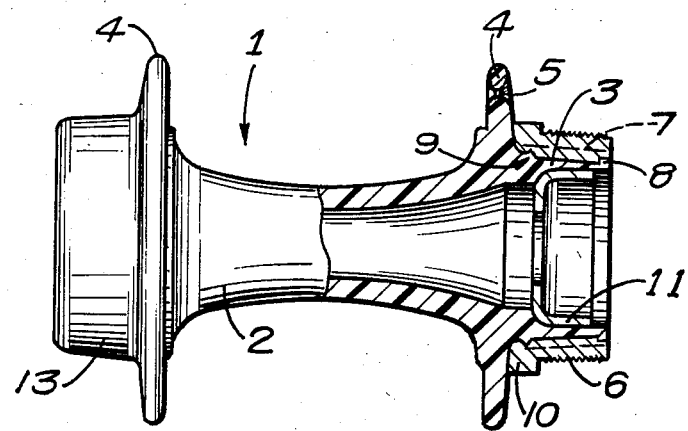
FIG. 1 is a partial longitudinal section through a hub shell with a bushing force-fit into it.
Figure 2:
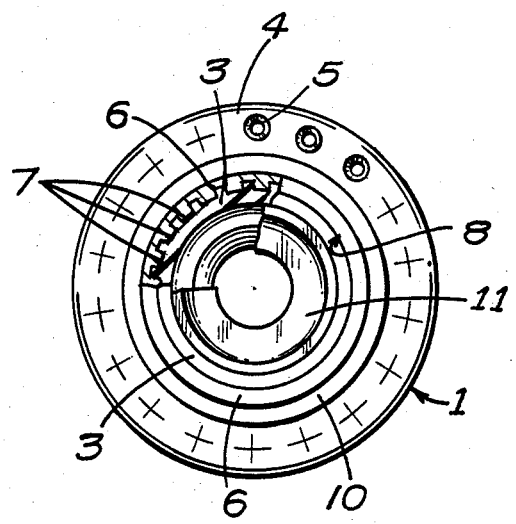
FIG. 2 is a partial front section through the hub shell in FIG. 1.

Referring to FIGS. 1 and 2, a hub shell 1 is in one piece and consists of thermoplastic, of fiberglass-reinforced impact-resistant polyamide for example. It can be high-pressure injection molded. In the center is a tube 2. Tube 2 is connected to two hub heads 3, 13 that have flanges 4 with perforations 5 to accommodate wheel spokes.

In the embodiment illustrated, a metal ring 6 is positively connected externally to one of the hub heads 3, specifically to the one that the chain drive will be attached to, in such a way that it can neither rotate nor be displaced axially. Optionally, head 13 can be configured identical to head 3 for receiving ring 6.

Hub head 3 tapers conically outward where it accommodates the metal ring 6 and the inside surface of the metal ring 6 also tapers conically outward to match. Metal ring 6 has a number of grooves 7 in its inner surface that are conically parallel to one another and to its longitudinal axis. Ring 6 also has a continuous annular groove 8 around its inner surface at what will later be the outer end.

Parallel longitudinal grooves 7 and annular groove 8 are completely filled with the material of the corresponding hub head 3 once hub shell 1 and metal ring 6 are joined, resulting in a highly non-rotating positive connection that will transmit the driving forces as a result of engagement between the material of hub head 3 and longitudinal grooves 7. The material in continuous annular groove 8 prevents ring 6 from sliding off head 3 axially.

Metal ring 6 consists in a practical way of aluminum and can be manufactured very simply by upsetting. Upsetting can be carried out in such a way as to produce a small, annular second groove or fold 9 inside the ring along the ridges between longitudinal grooves 7. Material from hub head 3 can also enter groove or fold 9 to provide optimal reinforcement against axial displacement.

Metal ring 6 can easily be provided with fine outer threading to accept the chain wheel. Ring 6 also has a limiting shoulder 10 on the outside of its inner end for the chain wheel to be screwed against.

The inside of hub head 3 on hub shell 1 accepts either an outer bushing 11 or a complete bearing. The bushing or complete bearing is overdimensionally forced in a practical way into hub head 3, which additionally permanently secures the inner positive connection between the material of hub head 3 and the corresponding seating in ring 6 provided for that connection.

One example of a method of manufacturing a rear hub shell of the aforesaid type will now be described.

The hub head 3 of a hub shell 1, itself high-pressure injection molded in one piece out of thermoplastic, that is to be covered with a ring 6 is brought into contact with the ring. The conical taper of the parts in question or of the areas in question produces a certain amount of loose engagement between hub head 3 and metal ring 6. The material of the outer wall of hub head 3 can accordingly now be very easily plasticized by heating ring 6 until it begins to flow. Pressure that is directed to force metal ring 6 completely onto head 3 is now exerted and both parts simultaneously vibrated. This can easily be done by positioning both parts vertically on a vibrator and applying a weight. It is also of course possible to mount the parts in a vibrating vise. The plasticizing in connection with the aforesaid weighting and with facilitating the flow of the plasticizing material by means of vibration ensures that the longitudinal grooves 7, the continuous annular groove 8, and if necessary the continuous upset fold 9 in metal ring 6 will fill up.

The diametrical ratios at the outer surface of hub head 3 are selected in relation to the accommodation bore in metal ring 6 to provide enough excess material to ensure the desired complete filling of longitudinal grooves 7, annular groove 8, and if necessary upset fold 9.

A core is inserted inside hub shell 1 while the aforesaid joint is being established to prevent the hub-head material from escaping into the interior space.

It will be appreciated that the instant specification and claims are set forth by way of illustration and not limitation, and that various modifications and changes may be made without departing from the spirit and scope of the present invention.

What is claimed is:

1. A rear hub shell for a bicycle, comprising a one-piece body made of plastic and having a spoke flange and a hub head on both ends thereof, a metal ring with a fine outside thread and means positively and externally connecting the ring to at least one of the hub heads to prevent rotation and axial displacement of the ring relative to the hub head, said means including an annular recess on the inner surface of the ring in the vicinity of the spoke flange and filled with the material of the hub head.

2. The hub shell as in claim 1, wherein the inner surface of the metal ring has grooves that are parallel to one another and to its longitudinal axis and wherein the hub head has mating portions filling the grooves.

3. The hub shell as in claim 1, wherein the metal ring has a continuous annular groove and the hub head has an annular projection filling the annular groove.

4. The hub shell as in claim 1, wherein the metal ring has a limiting shoulder.

5. The hub shell as in claim 1, wherein the metal ring consists of aluminum.

6. The hub shell as in claim 1, wherein the one-piece body consists of thermoplastic.

7. The hub shell as in claim 6, wherein the thermoplastic consists of fiberglass-reinforced polyamide.

8. The hub shell as in claim 1, wherein the hub head has an inside surface and further comprising a bushing force-fit into the inside surface of the hub head.

9. The hub shell as in claim 1, wherein the hub head tapers conically outward where it accommodates the metal ring and the metal ring has an inside surface having a matching taper.

* * * * *